US011410234B2

(12) United States Patent
Agarwal et al.

(10) Patent No.: US 11,410,234 B2
(45) Date of Patent: Aug. 9, 2022

(54) SYSTEM AND METHOD FOR DYNAMIC IMPLEMENTATION OF EXCHANGE TRADED FUNDS

(71) Applicant: JPMorgan Chase Bank, N.A., New York, NY (US)

(72) Inventors: Brij Agarwal, Glen Ridge, NJ (US); Joanna M. Gallegos, New York, NY (US); Paul Edward Shield, Jr., New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 27 days.

(21) Appl. No.: 16/111,736

(22) Filed: Aug. 24, 2018

(65) Prior Publication Data

US 2019/0066208 A1 Feb. 28, 2019

Related U.S. Application Data

(60) Provisional application No. 62/549,462, filed on Aug. 24, 2017.

(51) Int. Cl.
*G06Q 40/04* (2012.01)
*G06Q 30/02* (2012.01)

(52) U.S. Cl.
CPC ......... *G06Q 40/04* (2013.01); *G06Q 30/0283* (2013.01)

(58) Field of Classification Search
CPC ........ G06Q 40/00; G06Q 40/08; G06Q 40/04; G06Q 30/0283
See application file for complete search history.

(56) References Cited

U.S. PATENT DOCUMENTS

| | | | | |
|---|---|---|---|---|
| 9,805,419 | B1* | 10/2017 | Weisz | G06Q 40/04 |
| 2005/0108146 | A1* | 5/2005 | Bond | G06Q 40/06 705/37 |
| 2007/0055599 | A1* | 3/2007 | Arnott | G06Q 40/00 705/35 |
| 2009/0198631 | A1* | 8/2009 | McGarel | G06Q 40/00 705/36 R |
| 2011/0047094 | A1* | 2/2011 | Altomare | G06Q 40/06 705/36 R |
| 2015/0317737 | A1* | 11/2015 | Wallace | G06Q 40/06 705/36 R |

(Continued)

*Primary Examiner* — Scott C Anderson
*Assistant Examiner* — Xavier M. Bennett
(74) *Attorney, Agent, or Firm* — Greenberg Traurig LLP (57) ABSTRACT

Systems and methods for dynamic implementation of exchange traded funds. In one embodiment, a method for dynamic implementation of exchange traded funds may include: (1) receiving a start of day value for a holding comprising a plurality of funds; (2) calculating a current value for the holding by applying a plurality of conducted trades after the start of day value involving at least one fund in the holding; (3) applying a plurality of open orders to at least one of the funds in the holding; (4) determining a per unit fund basket based on the current value; (5) optimizing the per unit fund basket; (6) compliance checking the per unit fund basket; (7) adjusting the per unit fund basket by using tax lot information to harvest a highest tax lot and a lowest tax lot; and (8) rebalancing the per-unit basket to match a next day index.

15 Claims, 7 Drawing Sheets

(56) References Cited

U.S. PATENT DOCUMENTS

| | | | | |
|---|---|---|---|---|
| 2015/0324919 A1* | 11/2015 | Riggs | ............... | G06Q 40/06 |
| | | | | 705/36 R |
| 2016/0063622 A1* | 3/2016 | Van Tol | ............ | G06Q 40/06 |
| | | | | 705/37 |
| 2016/0180462 A1* | 6/2016 | Tull, Jr. | ............ | G06Q 40/04 |
| | | | | 705/37 |
| 2017/0004580 A1* | 1/2017 | Phillips | ............ | G06Q 40/06 |
| | | | | 705/37 |
| 2017/0011462 A1* | 1/2017 | Anliker | ............ | G06Q 40/06 |
| 2017/0200228 A1* | 7/2017 | Bryant | ............ | G06Q 40/04 |
| 2017/0372422 A1* | 12/2017 | Hays | ............ | G06Q 30/0201 |
| 2019/0333151 A1* | 10/2019 | Gallacher | ......... | G06Q 40/04 |

\* cited by examiner

SYSTEM AND METHOD FOR DYNAMIC IMPLEMENTATION OF EXCHANGE TRADED FUNDS

RELATED APPLICATIONS

This application claims priority to U.S. Provisional Patent Application Ser. No. 62/549,462, filed Aug. 24, 2017, the disclosure of which is hereby incorporated, by reference, in its entirety.

BACKGROUND OF THE INVENTION

1. Field of the Invention

The present disclosure generally relates to a strategic platform for exchange traded assets, and, more particularly, to systems and methods for dynamic implementation of exchange traded funds.

2. Description of the Related Art

Exchange traded funds (ETFs) generally require funds to project their composition and valuation for next day open, so daily processing that is usually done overnight has to be compressed to a very short period at daily close. Further, most of the ETFs trade on a very low fee and/or margin.

SUMMARY OF THE INVENTION

Systems and methods for dynamic implementation of exchange traded funds. In one embodiment, in an information processing apparatus comprising at least one computer processor, a method for dynamic implementation of exchange traded funds may include: (1) receiving a start of day value for a holding comprising a plurality of funds; (2) calculating a current value for the holding by applying a plurality of conducted trades after the start of day value involving at least one fund in the holding; (3) applying a plurality of open orders to at least one of the funds in the holding; (4) determining a per unit fund basket based on the current value; (5) optimizing the per unit fund basket; (6) compliance checking the per unit fund basket; (7) adjusting the per unit fund basket by using tax lot information to harvest a highest tax lot and a lowest tax lot; and (8) rebalancing the per-unit basket to match a next day index.

In one embodiment, the method may further include communicating the per unit fund basket to a fund accountant. The method may further include receiving a processed per unit fund basket from the fund accountant, wherein the processed per unit fund basket has been processed with corporate actions and valued based on a fair value pricing model.

In one embodiment, the method may further include presenting the per-unit basket to authorized participants for approval.

In one embodiment, the step of determining a per unit fund basket based on the current value may include determining a number of units for the holding; and using the number of units to divide the holding into a plurality of per unit fund baskets.

In one embodiment, the step of optimizing the per unit fund basket may include performing at least one of a risk model check and a liquidity check.

In one embodiment, the compliance check may include a buy or sell restriction check, a banned party check, and/or a Global Family Name or a Standard Party Name check.

In one embodiment, the step of adjusting the per unit fund basket by using tax lot information to harvest a highest tax lot and a lowest tax lot may include identifying a plurality of securities in the per unit fund basket having a minimum loss or a maximized gain; and creating a create/redeem basket of the identified securities.

In one embodiment, the step of rebalancing the per unit basket to match a next day index may include adding or subtracting funds from the per unit basket based on the next day index.

In one embodiment, the method may further include publishing the per unit basket.

According to another embodiment, a system for dynamic implementation of exchange traded funds may include an ETF processing engine comprising at least one computer processor; a position engine; a trade generator; a compliance engine; and a taxlot engine. The ETF processing engine may receive a start of day value for a holding comprising a plurality of funds from the position engine, and provide a plurality of conducted trades after the start of day value involving at least one fund in the holding, calculate a current value for the holding by applying the plurality of conducted trades. The position engine may provide a plurality of open orders to at least one fund in the holding. The ETF processing engine may apply the plurality of open orders, determine a per unit fund basket based on the current value, and optimize the per unit fund basket. The compliance engine may compliance check the per unit fund basket, and the taxlot engine may adjust the per unit fund basket by using tax lot information to harvest a highest tax lot and a lowest tax lot. The ETF engine may rebalance the per-unit basket to match a next day index received from an index provider.

In one embodiment, the ETF processing engine may communicate the per unit fund basket to a fund accountant and receive a processed per unit fund basket from the fund accountant. The processed per unit fund basket may be processed with corporate actions and valued based on a fair value pricing model.

In one embodiment, the ETF processing engine may present the per-unit basket to authorized participants for approval.

In one embodiment, the ETF processing may determine a per unit fund basket based on the current value by determining a number of units for the holding; and using the number of units to divide the holding into a plurality of per unit fund baskets.

In one embodiment, the ETF processing engine may optimize the per unit fund basket by performing at least one of a risk model check and a liquidity check.

In one embodiment, the compliance engine may compliance check at least one of a buy or sell restriction, a banned party list, a Global Family Name, and a Standard Party Name.

In one embodiment, the taxlot engine may adjust the per unit fund basket by identifying a plurality of securities in the per unit fund basket having a minimum loss or a maximized gain, and creating a create/redeem basket of the identified securities.

In one embodiment, the ETF processing engine may rebalance the per unit basket by adding or subtracting funds from the per unit basket based on the next day index.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to systems and methods for dynamic implementation of exchange traded funds.

In embodiments, a strategic platform for exchange traded assets or "SPECTRA," may include automation controls that generate a Portfolio Composition File ("PCF"), take orders, generate orders for Cash-in-Lieu ("CIL") securities, pass-through transaction cost, pre-process corporate actions, project next-day-open, rebalance, trade, and reconcile trades. Although the term "SPECTRA" is used herein, it should be recognized that this is non-limiting and any platform of platforms that performs the disclosed functions may be used as is necessary and/or desired.

ETFs have set a standard for transparency that is generally limited to broadly available index funds. Since these indexes are broadly available and tracked, investment managers do not have to worry about someone reverse engineering their strategy or getting arbitraged. In embodiments, a similar transparency may be applied to active and alternative ETFs. The platform may maintain entitlement rules at the strategy level, and may publish the final PCF to all market participants all at once so that no participant has an advantage. In addition, the Indicative Optimized Portfolio Value ("IOPV") may be calculated periodically (e.g., every 15 seconds) during the trading day. Narrow Bid-Offer spread among different market makers may help keep the ETF trade competitively.

In embodiment, the platform may provide detailed valuation to market makers to price ETFs accurately.

In embodiments, the platform may provide a seamless, end-to-end integration for authorized participants, investment managers, market makers, order takers, traders, hedging desks, corporate actions, middle offices, back-offices, fair value pricing, fund accounting, treasury and custody. In embodiments, this may be achieved by managing the workflow as a state machine with well-defined events and state transitions. The state may be encapsulated in a common normalized data structure (e.g., a PCF basket) and set of services that each act according to their function, and reconciled along the way as basket is updated due to corporate actions, rebalancing, or creation/redemption. Each fund may follow a separate state machine of its own, and the status of the workflow may be available at any time using, for example, an interface, such as a Javascript/html5 user interface.

In addition, in embodiments, the platform may provide an operational dashboard and for troubleshooting. An example of such a platform is based on Splunk. In one embodiment, smart indexing and querying may be built to quickly isolate issues. Scalability and availability may be achieved by managing each fund as an independent pipeline.

Embodiments may support, for example, single factor building blocks (e.g., Dividend, Growth, Momentum ETFs), multi-factor smart beta, multi-strategy, multi-sleeve, multi-manager, multi-asset class ETFs such as Unconstrained Fixed Income ("JPGB") and Diversified Alternatives ETF ("JPHF") that provide Hedge Fund-like strategies, etc.

In embodiments, the platform may provide timely, transparent accurate portfolio data. PCF is the key protocol for communicating portfolio analytics to the market participants as that allows market price of ETFs shares on U.S. or global exchanges to trade close to their Net Asset Value ("NAV"). While it is easy to manage pure equity holdings, it gets very complex as fixed income securities with factors, swap instruments, and currency forwards are introduced. In addition, because the PCF is a projection of next day's portfolio basket, complex corporate actions can add tremendous challenge. Embodiments may systematically map corporate actions from index providers and custodians, and build a rule set to automate processing of corporate actions.

In one embodiment, an ETF manager may project the next day's portfolio basket, and this basket becomes the basis to take create/redeem (C/R) orders from an authorized participant (AP) on T+1. The next day basket projection process uses several inputs to calculate the next day's basket. Exemplary inputs to the process include current holdings, trades for the day, C/R orders received on the fund, etc. Per unit basket generating process may include multiple steps to determine the C/R basket that is being sent to For example, the process may take the start of the day fund holding, apply all the trades done on the day, and apply any open orders sent to the market for executions to calculate the real-time holding. After fund holdings are determined, a per unit fund basket is calculated, optimized and rounded for the lot size and minimum trading quantity, compliance checked, taxlot harvested, and rebalanced (e.g., rebalanced transactions are adjusted during the rebalance period to match the index). Once basket is published, a fund accountant may publish the basket to the APs and that become the basis to receive C/R order next day.

Figure 1:
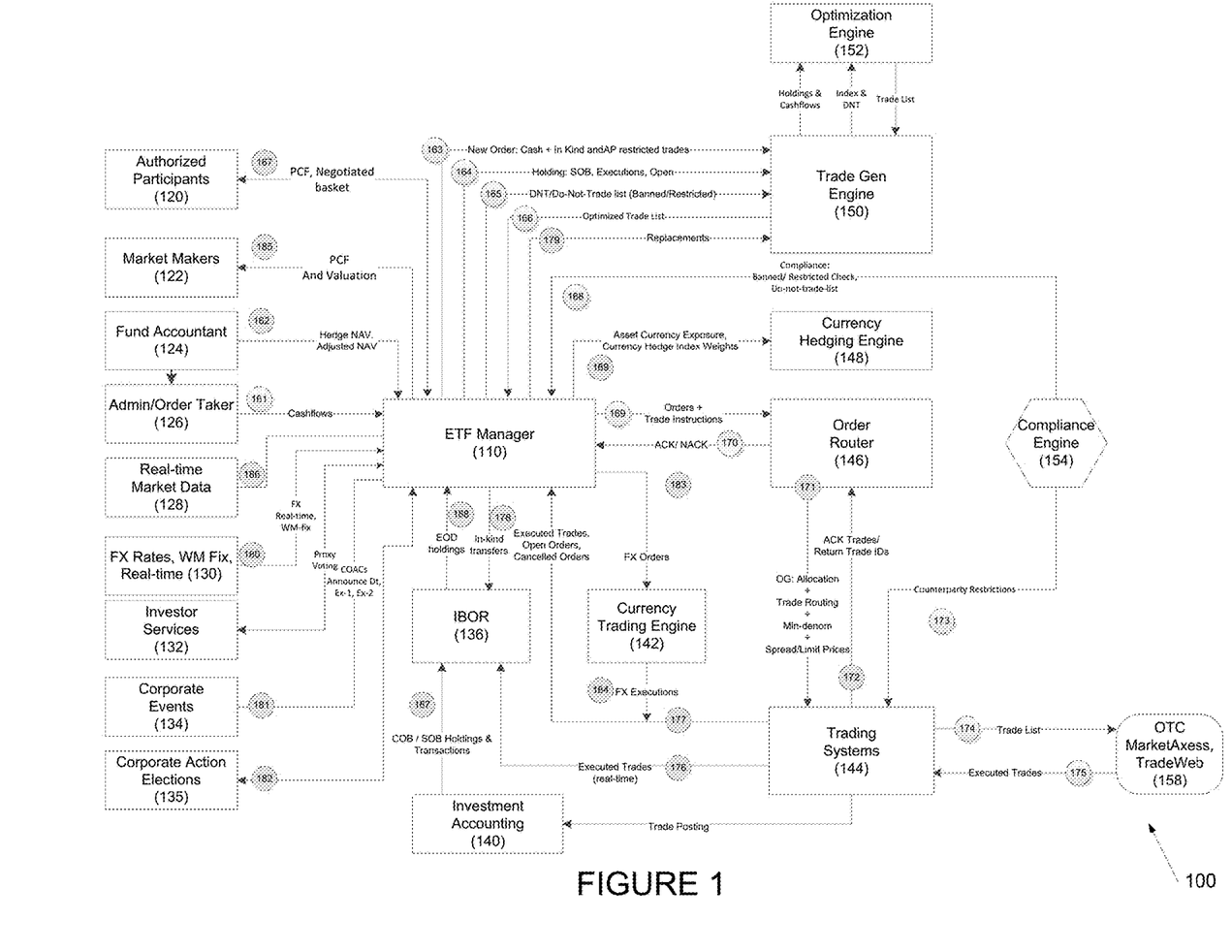
FIG. 1 depicts a strategic platform for exchange traded assets according to one embodiment.

FIG. 1 depicts a strategic platform for exchange traded assets according to one embodiment. System 100 may include ETF manager 110, which may be a computer program or application executed by one or more computer servers (not shown). ETF manager 110 may interact with a plurality of inputs and/or data sources, including authorized participants 120 (e.g., entities that are authorized to create or redeem shares), market makers 122, fund accountant 124, admin/order taker 126, real-time market data 128, real-time foreign exchange (FX) rates and WM Fix 130, investor services 132 (e.g., may give up voting rights for scalability), corporate events 134 (e.g., events associated with a corporation), corporate action elections 135 (e.g., elections at a corporation), and Investment of Book of Records ("IBOR") 136.

In one embodiment, ETF manager 100 may receive a feed from Edgar database to scan for all 13D/A filings. This data may be used to invest in Merger Arb ETF.

IBOR 136 may receive data from investment accounting 140, and from trading systems 142. Trading systems may interface with market data feeds 158 (e.g., OTC Market-Axess, TRADEWEB, etc.) and may provide a list of trades to execute, and a list of executed trades. The trades to execute may be provided by ETF manager 110, which may provide FX orders to currency trading engine 142, which may provide FX executions to trading systems 144.

Trades may be routed via order router 146, and compliance with, for example, counterparty restrictions may be enforced by compliance engine 154.

Currency hedging engine 148 may receive asset currency exposure and currency hedge index weights from ETF manager 110.

Trade gen engine 150 may interface with ETF manager 110 and with optimization engine 152. In one embodiment, trade gen engine may use machine learning to review liquidity data from multiple sources and assigns a liquidity score to generate trades. For example, a liquidity module (not shown) may score liquidity of bonds (e.g., fixed income) and may use that to trade ETF underliers.

Figure 7:
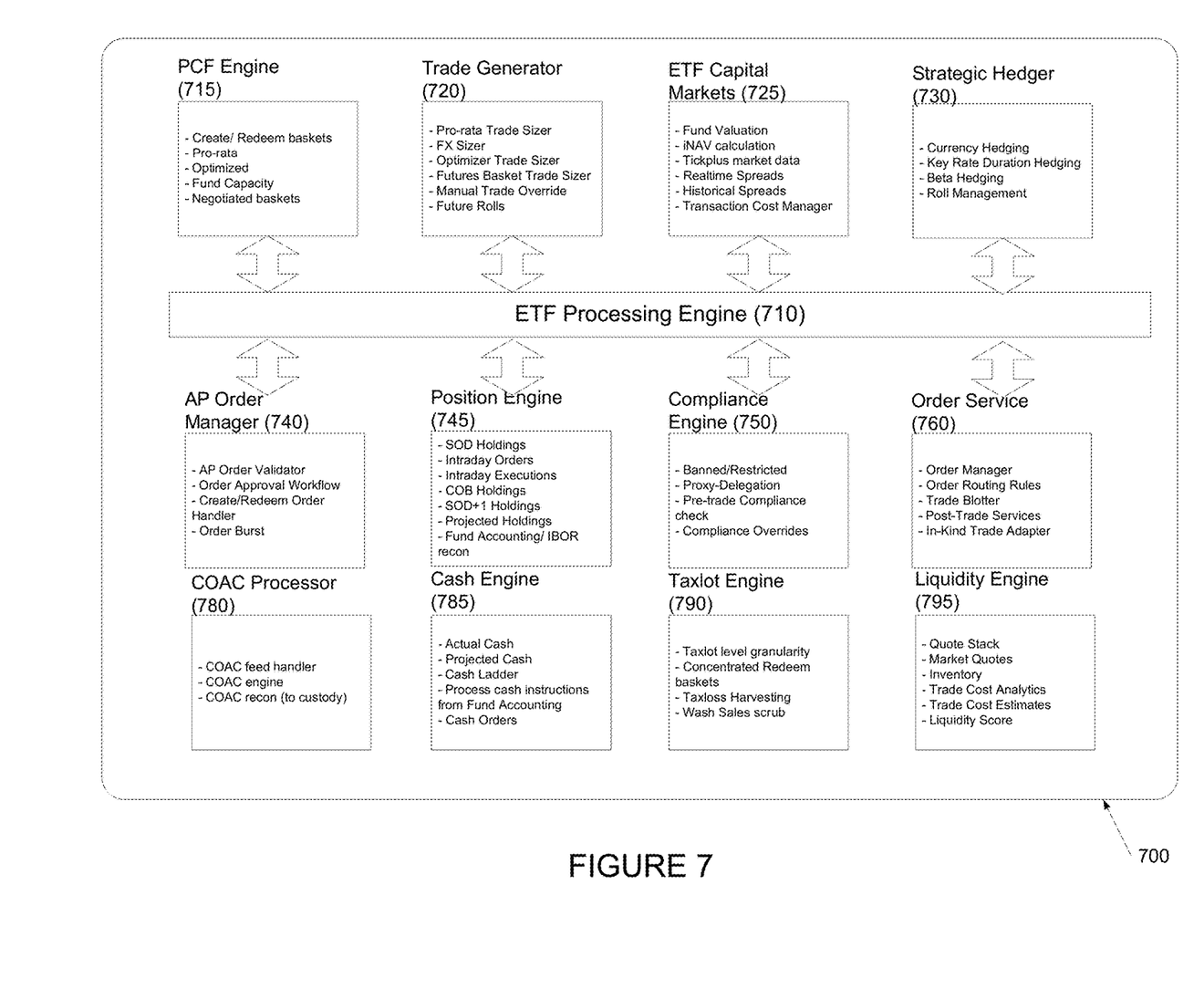
FIG. 7 depicts key modules of ETF processing according to one embodiment.

An embodiment of ETF manager 110 is provided in FIG. 7. System 700 may include ETF processing engine 710, which may interact with PCF engine 715, trade generator 720, ETF capital markets engine 725, strategic hedger engine 730, AP order manager 740, positions engine 745, compliance engine 750, order service 760, Corporate Actions (COAC) processor 780, cash engine 785, taxlot engine 790, and liquidity engine 795 as indicated.

For example, AP Orders 740 may be received and processed by ETF engine 710. Based on the order trades (e.g., CIL of in-kind) generated, compliance checked (e.g., by compliance engine 750), and routed to the trading systems by order service 760.

As another example, several reporting and monitoring tools, such as real-time available and projected cash monitor (e.g., from cash engine 785), real-time liquidity monitor of the bonds/equities (e.g., from liquidity engine 795), and real-time valuation of NAV and Spread (e.g., from ETF capital markets engine 725) may be added to facilitate trading and to provide real-time fund performance.

Referring again to FIG. 1, according to one embodiment, a method may include the following.

In step 161, ETF manager 110 may receive an ETF order from ETF admin 126. The ETF order may be based on cash, in-kind, etc.

In step 162, fund accountant 124 may provide the NAV for the fund to the ETF manager 110 for Approval/Execution.

In step 163, new order cash and compliance restrictions may be used by trade generator 150.

In step 164, real-time trade position (SOB position+ Executions+Open Orders) may be refreshed by ETF Manager 110.

In step 165, any restricted securities may be factored-in to exclude from orders.

In step 166, trade generator 150 may generate any optimized trade list for given order.

In step 167, negotiated baskets for current trading date may be negotiated with authorized participants 120. In one embodiment, this may be fore fixed income ETFs.

In step 168, compliance engine 154 may provide ETF manager with banned/restricted information. For example, compliance engine 154 may provide a do not trade list.

In step 169, ETF manager 110 may route orders to order router 146. In one embodiment, ETF manager 110 may maintain routing rules and may send instructions to order router 146 to send orders to the appropriate trading desk.

In step 170, order router 146 may acknowledge the order.

In step 171, order router 146 may send the allocation, trade routing, minimum denomination, and spread/limit prices to trading systems 144.

In step 172, trading systems 144 may acknowledge the trades and may return trade identifiers to order router 146.

In step 173, compliance engine 154 may provide counterparty restrictions to trading systems 144.

In step 174, trading systems 144 may provide OTC marketAxess, TradeWeb 158 with a trade list, and in step 175, OTC marketAxess, TradeWeb 158 may return executed trades.

In step 176, trading systems 144 may return the executed trades to IBOR 136, and in step 177, may provide executed trades, open orders, and cancelled orders to ETF manger 110.

In step 178, ETF manager 110 may provide in-kind transfers to IBOR 136.

In step 179, ETF manager 100 may provide replacements to trade gen engine 150.

In step 180, FX rates and WM fix may be provided in real time by FX rate and WM Fix module 130.

In step 181, corporate events module 134 may provide corporate events to ETF manager 110.

In step 182, corporate actions that are to be executed the following day are coordinated.

In step 183, ETF manager 110 may provide foreign exchange orders to currency trading engine 142.

In step 184, currency trading engine 142 may provide foreign exchange executions to the currency trading system and trades flow to investment accounting 140 and fund accountant 124.

In step 185, ETF manager 110 may provide PCF and valuation to market makers 122.

In step 186, real-time market data module may provide real-time market data to ETF manager 110.

In step 187, investment accounting engine 140 may provide close of business and start of business holdings and transactions to IBOR 136.

In step 188, IBOR 136 may provide end of day holdings to ETF manager 110.

In step 189, ETF manager may provide asset currency exposure, currency hedge index weights to currency hedging engine 148.

ETF manger 110 may send the PCF updates (PLFB changes) on a per-unit basis to ETF Admin 126 for applying corporate Actions (e.g., B1, B6-file). In one embodiment, today's holdings may be used to project tomorrow's open. This involves applying any corporate actions that are going to be realized overnight. Thus, ETF manger 110 projects the fund holdings to next day open ahead of the accounting systems, which lag by a day. Fund accountant 124 may adjust the prices and shares to reflect the same corporate actions.

In one embodiment, Admin/Order taker 126 may send the full PCF file with Corporate Actions and Cash projections (PLFA) (e.g., B3, B4, B5 files).

In one embodiment, the project (not official) NAV may be reconciled before presenting the final PCF to the portfolio manager (PM) for signoff.

In one embodiment, Admin/Order taker 126 may send the final PCF to the custodian (not shown).

In one embodiment, the custodian may distribute the PCF to the National Securities Clearing Corporation (NSCC) and receive a return PCF. For example, in the United States, the uploading of final PCF to NSCC site is done by the custodian, and Authorized Participants 120 take it from NSCC. ETF manager 110 may create the final PCF, which is sent to the custodian in the United States while in international markets, ETF manger 110 may send the final PCF to Authorized Participants 120 and Market Makers 122.

In addition, in both markets, the Valuation PCF, which is what market makers 122 use to value to ETF and make prices in secondary market, is sent directly by ETF manager 110 to Market Makers 122. ETF manger 110 may further compare the iNAV published by the InterContinental Exchange (ICE) with the internal valuation that ETF manager 110 provides.

In one embodiment, Admin/Order taker 126 may send daily PCF and Excluded Assets file to iOPV provider (NYSE).

In one embodiment, ETF manger 110 may send Cash (rebalance) and Client (CIL-M) Trades from PODS to ETF Admin Fund Accounting before SOB.

In one embodiment, Admin/Order taker 126 may send Fund Holdings, NAV, pricing, etc. to a financial institution to update ETF holdings.

Figure 2:
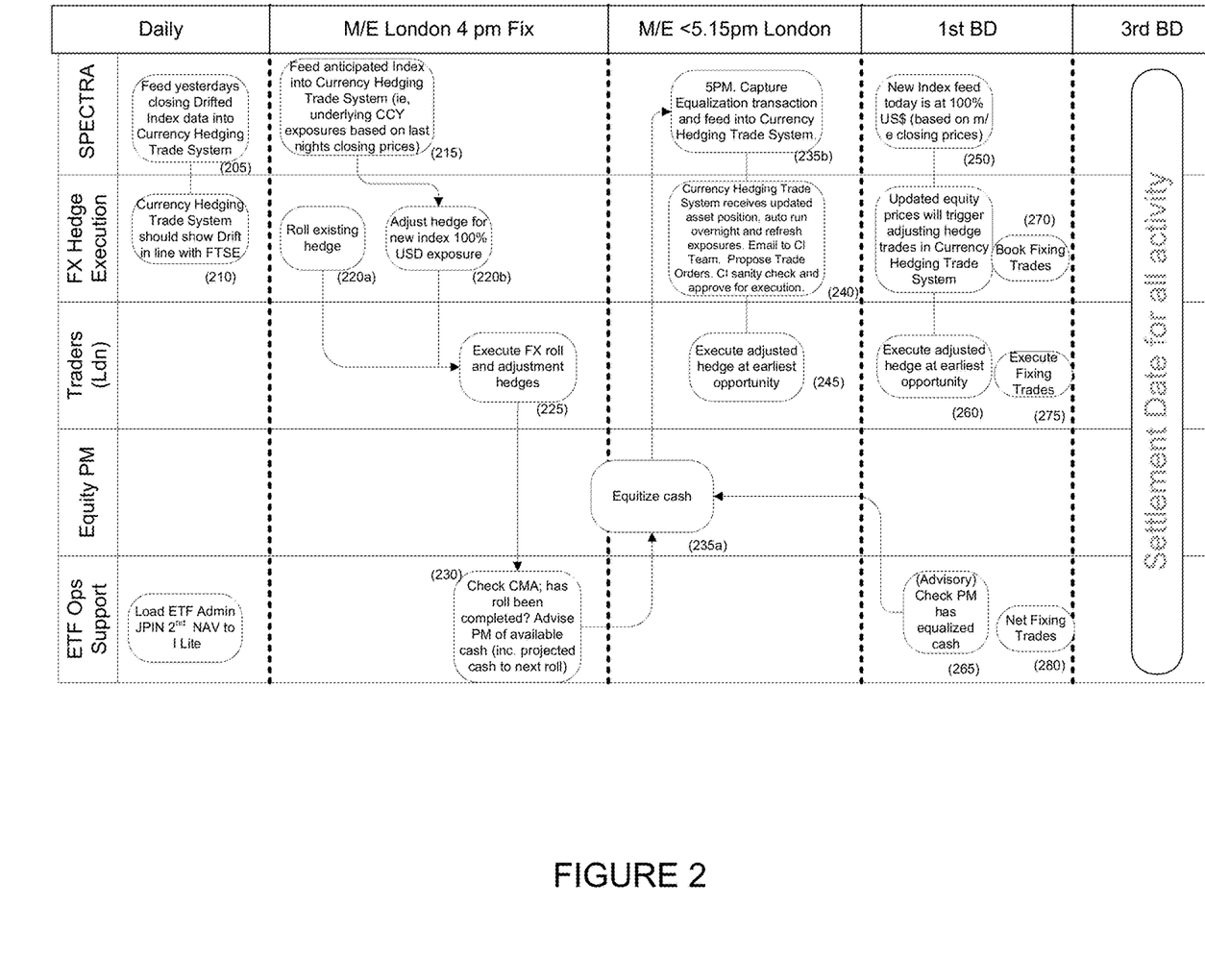
FIG. 2 depicts a method for exemplary monthly roll process flow according to one embodiment.

Referring to FIG. 2, a method for exemplary monthly roll process flow is depicted according to one embodiment. The process depicted in FIG. 2 is in the context of currency hedge funds; it should be recognized that the disclosure is not so limited.

On a daily basis, in step 205, the prior day's closing Drifted index may be provided to a currency hedging system (CAS) used by a currency implementation team. In one embodiment, RIMES data and WM Reuters Rates may be provided.

In step 210, the currency implementation team shows the drift in line with the Financial Times Stock Exchange (FTSE) index.

In step 215, at a specific time (e.g., Market Close, such as 4 PM London Fix for a currency market), the anticipated index may be provided to the currency hedging system. In one embodiment, currency hedges may be calculated and sent to the currency implementation team to raise FX forwards.

In step 220a, the existing hedge may be rolled, and in step 220b, the existing hedge may be adjusted for the new index. For example, it may be adjusted for 100% United States Dollar exposure.

In step 225, traders may execute the exchange roll and adjustment hedges at a certain time. For example, this may occur one hour before London Fixing time (i.e., 4 PM London time).

In step 230, ETF support may check to see if the roll has been completed, and may advise the Portfolio Manager, or PM, of available cash, including projected cash for the next roll. For example, embodiments may automatically calculate a real-time view of all actual cash and expected cash with respective settlement dates.

In step 235a, the cash may be equitized, and at a certain time, (e.g., 5 PM London time), in step 235b, an equitization (i.e., an action by a portfolio manager to utilize any available cash in the portfolio to invest into the fund investments in accordance with the funds strategy) transaction may be captured and provided to the currency hedging system.

In step 240, the currency hedging system may receive an updated asset position, and may re-run overnight and refresh exposures. It may provide the information to the currency implementation desk. The currency hedging system may propose trades to align the hedge weights, and the currency implementation desk may validate the trades and approve for execution with the foreign exchange (FX) traders.

In step 245, traders (e.g., in London) may execute the adjusted hedge. This may be executed at the earliest opportunity.

The next business day, in step 250, the new index feed may be at 100% of United States Dollars based on the Market End closing prices.

In step 255, the updated equity prices may trigger adjusting hedge trades in the currency hedging system. In step 260, the traders may execute the adjusted hedge.

In step 265, the ETF Ops Support may optionally check that the portfolio manager has equitized cash, and in step 270, the currency hedging system may book fixing trades, which may be executed by the traders in step 275. The fixing trades may be netted in step 280 by the ETF Ops Support.

On, for example, the third business day, all activity may be settled.

Embodiments reduce tracking error by calculating the fund valuation in real-time along with the Index, and by ensuring that a fund trades its securities and currency at the same time as its underlying benchmark.

Figure 3:
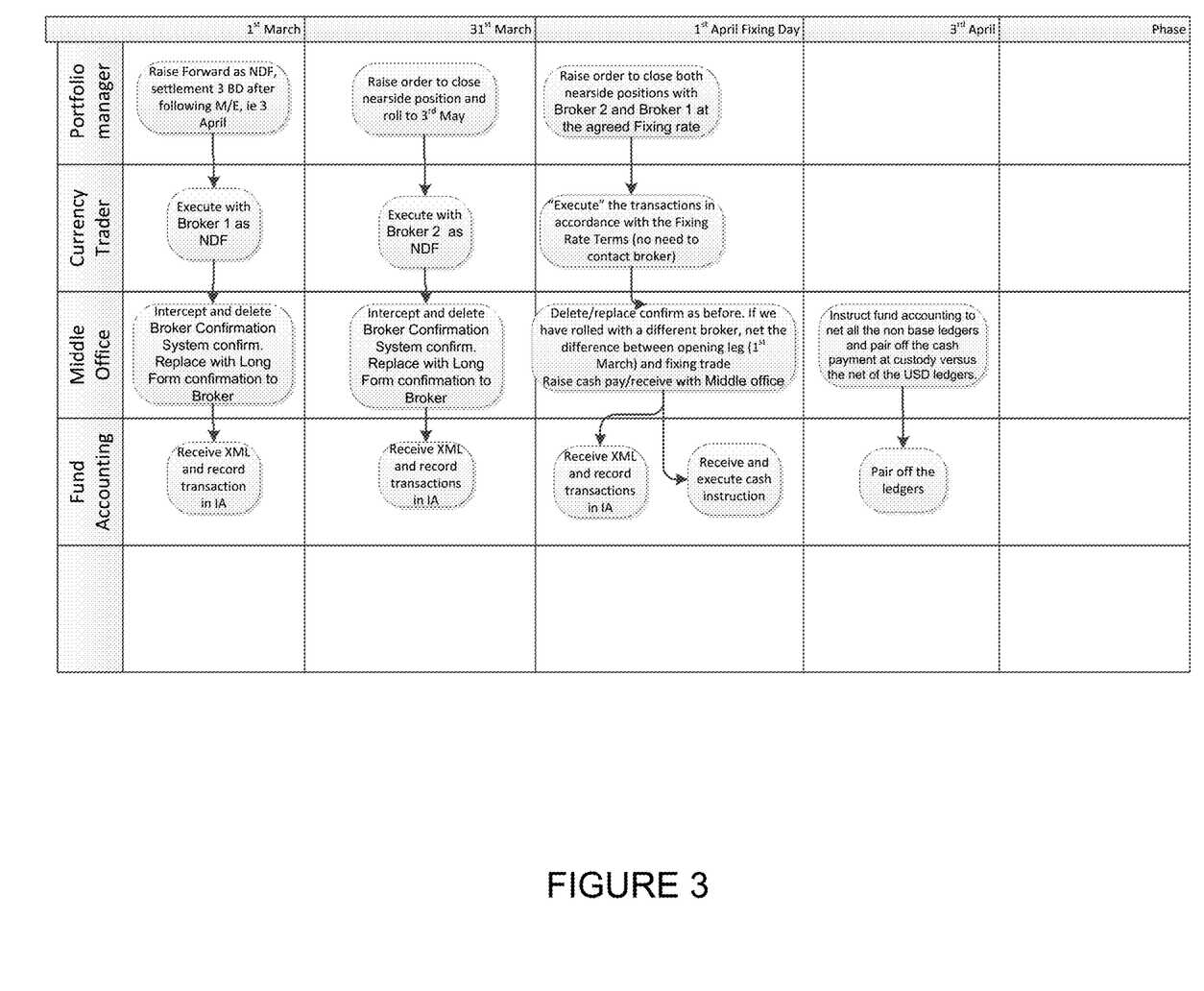
FIG. 3 depicts an exemplary fixing process for Deliverable Currencies Traded as NDF according to one embodiment.

FIG. 3 depicts an exemplary fixing process for Deliverable Currencies Traded as non-deliverable forward (NDF) according to one embodiment. In this example, the first trade date is March $1^{st}$. This and other dates, and the entities involved, are exemplary only.

For example, on the first trade date (e.g., March 1), the portfolio manager raises forward as a NDF with settlement three business days following month end ("M/E").

The currency trader may execute with a first broker as a NDF.

The middle office may intercept and delete the broker confirmation system's confirmation, and may replace with a long form confirmation.

Fund accounting may receive an XML file and record the transaction in Investment Accounting ("IA").

At the end of the month, the portfolio manager may raise an order to close the nearside position. The currency trader may execute with a second broker as a NDF. Deriv's MO may intercept and delete the broker confirmation system's confirmation, and may replace with a long form confirmation. Fund accounting may receive an XML file and record the transaction in the IA.

On fixing day (e.g., April 1), the portfolio manager may Raise order to close both nearside positions with the second broker and the first broker at the agreed Fixing rate The currency trader may "execute" the transactions in accordance with the Fixing Rate Terms (no need to contact broker).

The middle office may delete/replace confirm as before. If a different broker is used, the difference between opening leg (1st March) and fixing trade may be netted. Fund accounting may receive an XML file and record the transaction in the IA and may receive and execute a cash instruction.

On April 3, the middle office may instruct fund accounting to net all the non-base ledgers and pair off the cash payment at custody versus the net of the USD ledgers. Fund accounting may pair of the ledgers.

In embodiments, the data workflows are integrated among Portfolio Construction, Trading, Market Making, and Accounting. All other ETF providers have complete separation of each of these functions. By integrating as functions, the end-to-end flow, achieve timeliness of trading are automated, and thereby achieve low tracking error.

Figure 4:
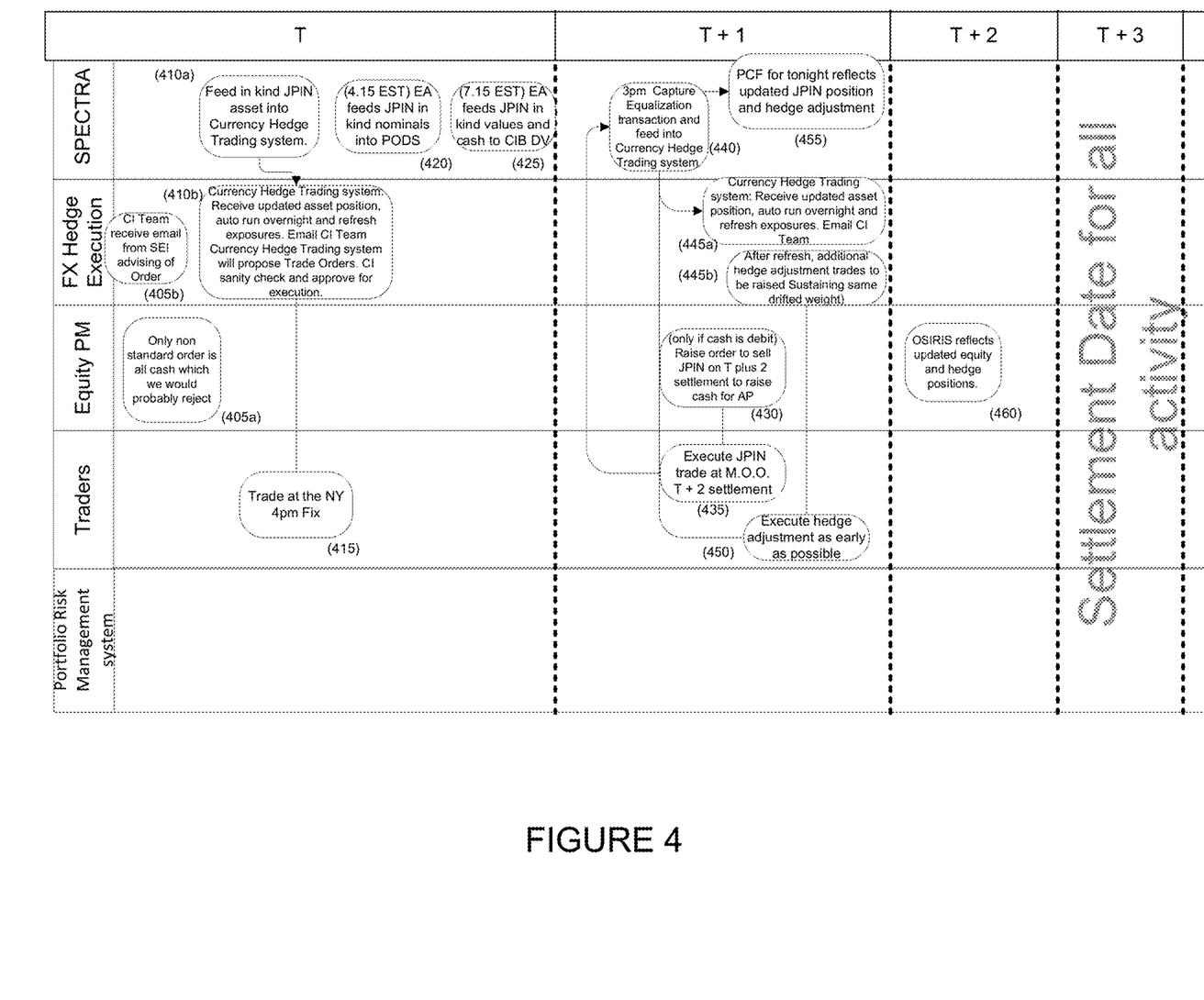
FIG. 4 depicts an exemplary daily create/redeem process flow according to one embodiment.

Referring to FIG. 4, an exemplary daily create/redeem process flow is disclosed according to one embodiment. For example, FIG. 4 depicts how an order processor handles in-kind orders (410a) for currency hedged ETF from Authorized Participants. On trade date, the most important aspect is to take the ETF creation/redemption of the Hedged ETF and break it down to specific functional tasks that are then handled by other processors. Embodiments take the in-kind order, calculate underlying currency exposures and suggest hedge trades to match the fund exposure (415) at NY 4 pm fixing. It then dispatches the position updates so all position management system (420) is updated, and creates cash transactions to update the Investment Accounting (425). With this all transactions are accounted on trade date (t).

On the following day (t+1), the ETF Manager performs a balancing act (which is iterative) (step 440 thru 455) as the underlying fund may get overweight or underweight. This may necessitate either liquidating some of the holdings, or equitizing cash to buy more equities (430). This itself may cause the hedges to re-adjust the hedges (445*b*). This preferably is done quickly (450) to minimize duration where the fund is exposed. The Portfolio Composition File (PCF), which reflects correct weights and next day risk management systems, may then be published.

Figure 5:
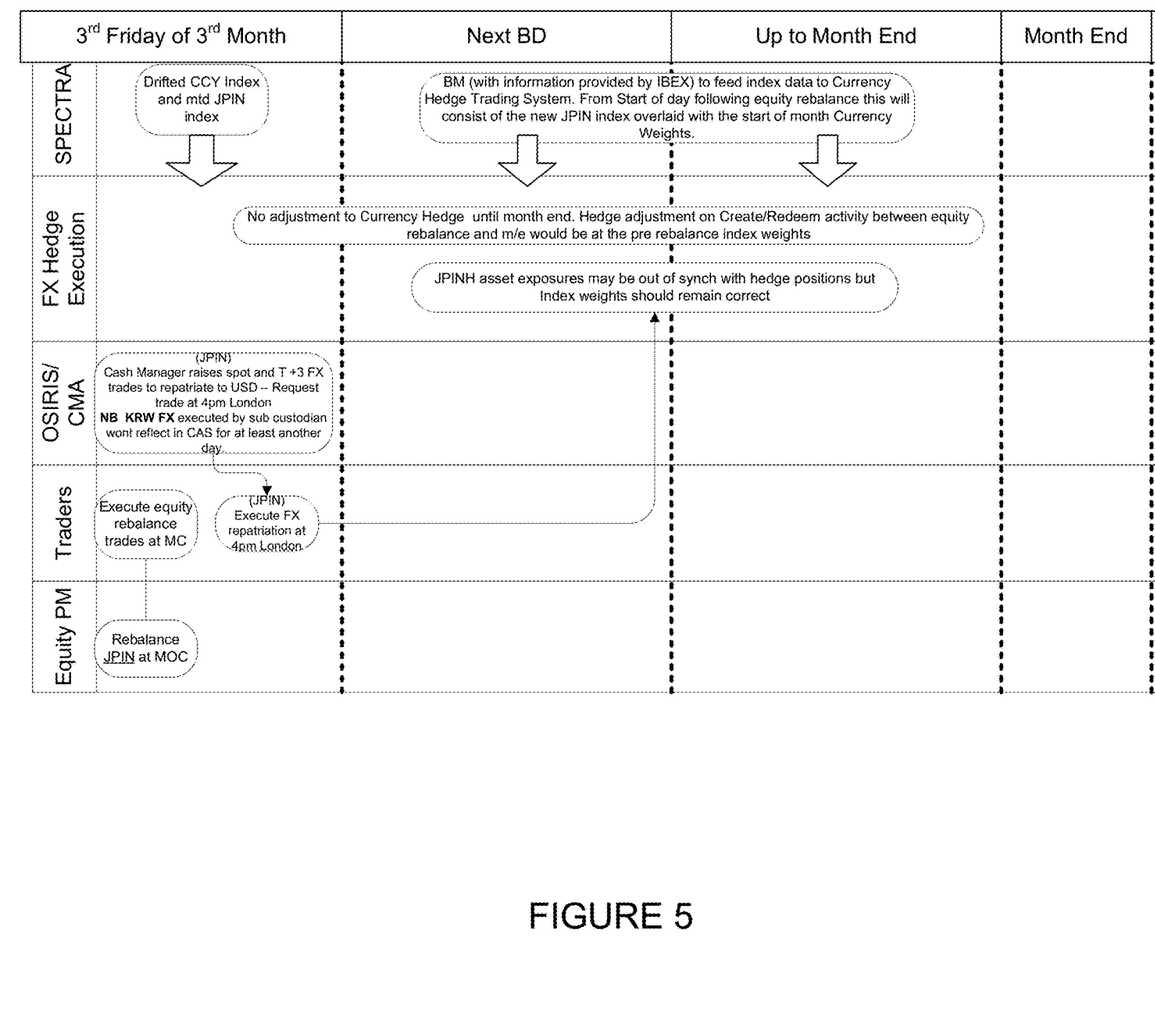
FIG. 5 depicts an exemplary process for an equity index rebalance according to one embodiment.

Referring to FIG. 5, an exemplary process for an equity index rebalance and currency trading is provided according to one embodiment. In embodiments, there may be complications dues to that fact that the Index rebalances on a different schedule than the currency roll. Thus, on fund rebalance date (typically 3rd Friday of month), the ETF processor (Hedger component) may automatically calculate the equity trades, and then the FX repatriation. This allows the rebalance of the main fund to happen at Market On Close on rebalance date with appropriate settlement date. Any minor adjustments due to drifting of index. The effectiveness of ETF processor may be measured by the size of the adjustment—the smaller the adjustment, the more precise the calculations.

Figure 6:
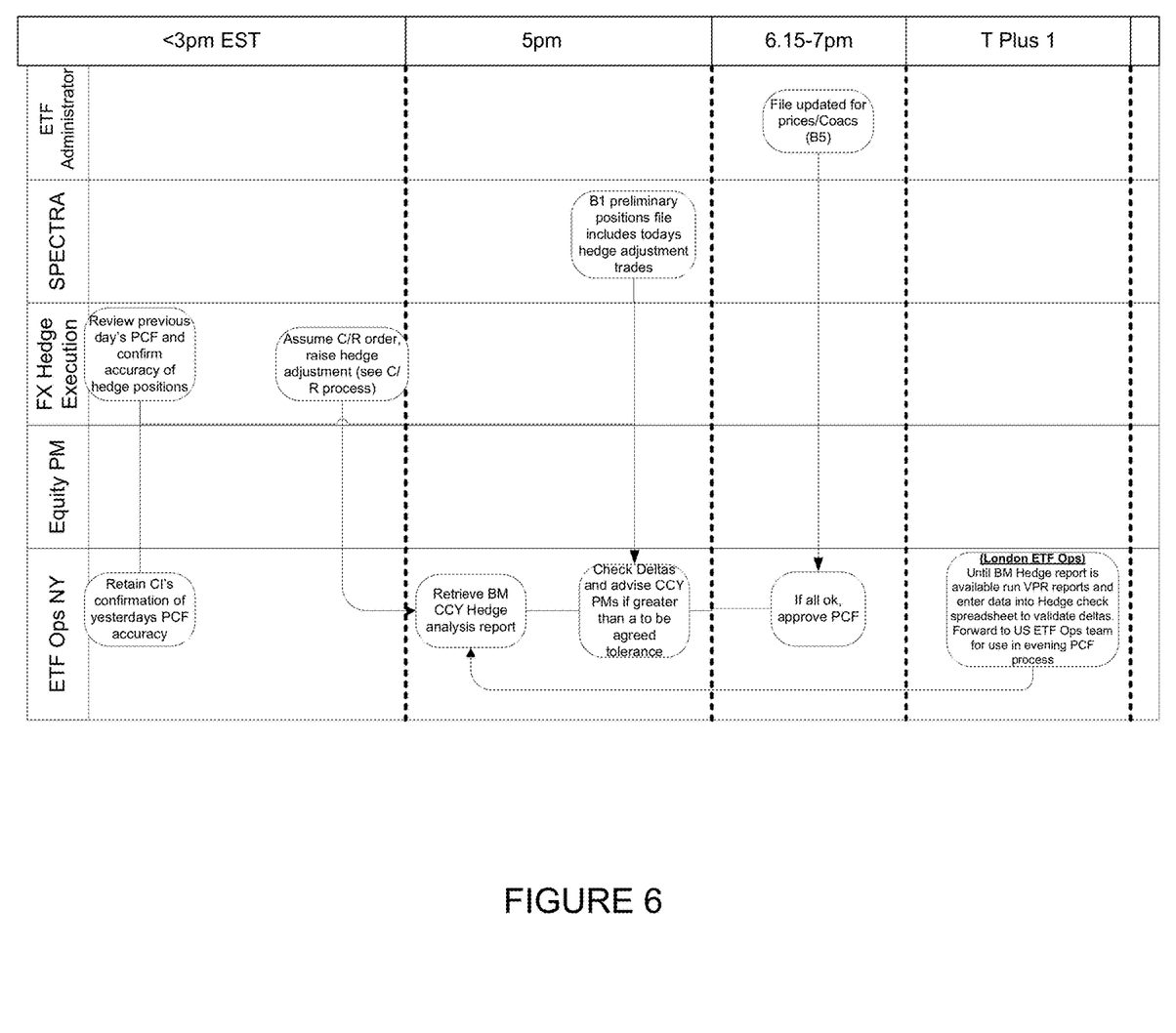
FIG. 6 depicts an exemplary daily PCF process according to one embodiment.

Referring to FIG. 6, an exemplary daily PCF process for the hedged ETF is provided according to one embodiment. As an example after fund-cut off, C/R orders on the hedge fund may be aggregated, and the aggregated amount may be hedged against the currencies' exposure of the tracking index. After trades are executed, the system may automatically calculate a C/R basket (B1) for next day. An operations team (e.g., a New York-based team) may review the day-over-day of the basket, and may send the basket to the fund accountant for pricing the basket and next day COAC processing. On T+1 basis Operations validates if all the new cash flows are fully hedged.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the ANDROID operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, FORTRAN, JAVA, Modula-2, Pascal, PROLOG, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for dynamic implementation of exchange traded funds, comprising:
receiving, by a trade generation engine computer program, a start of day value for a holding comprising a plurality of funds;
calculating, by the trade generation engine computer program, a real-time value for the holding by applying a plurality of conducted trades after the start of day value involving at least one fund in the holding and by applying a plurality of open orders to at least one of the funds in the holding;
determining, by the trade generation engine computer program, a per unit fund basket based on the real-time value;
executing, by the trade generation engine computer program, an optimization rule to optimize the per unit fund basket comprising executing a risk model check and a liquidity check;
generating, by the trade generation engine computer program using a machine learning model trained using liquidity data from a plurality of sources, a liquidity score for the per unit fund basket;
confirming, by the trade generation engine computer program, that the liquidity score for the per unit fund basket passes a liquidity score threshold;
checking, by the trade generation engine computer program, the per unit basket fund for compliance with a banned party list;
adjusting, by the trade generation engine computer program, the per unit fund basket by using tax lot information to harvest a highest tax lot and a lowest tax lot for each fund in the fund basket;
rebalancing, by the trade generation engine computer program, the per unit fund basket to match a next day index; and
publishing, by the trade generation engine computer program, the per-unit fund basket for approval.

2. The method of claim 1, further comprising:
communicating the rebalanced per unit fund basket to a fund accountant.

3. The method of claim 2, further comprising:
receiving a processed rebalanced per unit fund basket from the fund accountant, wherein the processed rebalanced per unit fund basket has been processed with corporate actions and valued based on a fair value pricing model.

4. The method of claim 1, wherein the step of determining a per unit fund basket based on the real-time value comprises:
determining a number of units for the holding; and
using the number of units to divide the holding into a plurality of per unit fund baskets.

5. The method of claim 1, wherein the trade generation engine computer program further checks the per unit basket fund for compliance with a buy or sell restriction check.

6. The method of claim 1, wherein the trade generation engine computer program further checks the per unit basket fund for compliance with a Global Family Name or a Standard Party Name check.

7. The method of claim 1, wherein the step of adjusting the per unit fund basket by using tax lot information to harvest a highest tax lot and a lowest tax lot comprises:
identifying a plurality of securities in the per unit fund basket having a minimum loss or a maximized gain; and
creating a create/redeem basket of the identified securities.

8. The method of claim 1, wherein the step of rebalancing the per unit basket to match a next day index comprises:
adding or subtracting funds from the per unit basket based on the next day index.

9. The method of claim 1, further comprising:
publishing the rebalanced per unit fund basket.

10. A system for dynamic implementation of exchange traded funds, comprising:
an ETF processing engine comprising at least one computer processor;
a position engine;
a trade generator;
a compliance engine; and
a taxlot engine;
wherein:
the ETF processing engine receives a start of day value for a holding comprising a plurality of funds from the position engine;
the position engine provides a plurality of conducted trades after the start of day value involving at least one fund in the holding;
the position engine provides a plurality of open orders to at least one fund in the holding;
the ETF processing engine projects a real-time value for the holding by applying the plurality of conducted trades and by applying the plurality of open orders;
the ETF processing engine determines a per unit fund basket based on the real-time value;
the ETF processing engine optimizes the per unit fund basket by executing a risk model check and a liquidity check;
the ETF processing engine generates a liquidity score using a machine learning model that is trained with liquidity data from a plurality of sources;
the compliance engine compliance checks the per unit fund basket for compliance with a panned party list;
the taxlot engine adjusts the per unit fund basket by using tax lot information to harvest a highest tax lot and a lowest tax lot for each fund in the fund basket;
the ETF processing engine rebalances the per unit fund basket to match a next day index received from an index provider; and
the EFT processing engine publishes the per-unit fund basket for approval.

11. The system of claim 10, wherein the ETF processing engine communicates the rebalanced per unit fund basket to a fund accountant and receives a processed per unit fund basket from the fund accountant, wherein the processed rebalanced per unit fund basket has been processed with corporate actions and valued based on a fair value pricing model.

12. The system of claim 10, wherein the ETF processing engine presents the rebalanced per unit fund basket to authorized participants for approval.

13. The system of claim 10, wherein the ETF processing determines the per unit fund basket based on the real-time value by determining a number of units for the holding; and using the number of units to divide the holding into a plurality of per unit fund baskets.

14. The system of claim 10, wherein the taxlot engine adjusts the per unit fund basket by identifying a plurality of securities in the per unit fund basket having a minimum loss or a maximized gain, and creating a create/redeem basket of the identified securities.

15. The system of claim 10, wherein the ETF processing engine rebalances the per unit basket by adding or subtracting funds from the per unit basket based on the next day index.

\* \* \* \* \*